(12) United States Patent
Schechter et al.

(10) Patent No.: US 9,569,467 B1
(45) Date of Patent: Feb. 14, 2017

(54) INTELLIGENT NEWS MANAGEMENT PLATFORM AND SOCIAL NETWORK

(71) Applicants: David Schechter, Dallas, TX (US); Christopher R. Berg, Plano, TX (US)

(72) Inventors: David Schechter, Dallas, TX (US); Christopher R. Berg, Plano, TX (US)

(73) Assignee: Level 2 News Innovation LLC, Dallas, TX (US)

( * ) Notice: Subject to any disclaimer, the term of this patent is extended or adjusted under 35 U.S.C. 154(b) by 394 days.

(21) Appl. No.: 13/830,977

(22) Filed: Mar. 14, 2013

Related U.S. Application Data

(60) Provisional application No. 61/733,636, filed on Dec. 5, 2012.

(51) Int. Cl.
*G06F 17/30* (2006.01)
(52) U.S. Cl.
CPC ... *G06F 17/30283* (2013.01); *G06F 17/30743* (2013.01)
(58) Field of Classification Search
CPC .............. G06F 17/3053; G06F 17/3089; G06F 17/30743
See application file for complete search history.

(56) References Cited

U.S. PATENT DOCUMENTS

| | | | | |
|---|---|---|---|---|
| 6,185,531 B1 * | 2/2001 | Schwartz | .............. | G06F 17/271 704/236 |
| 6,289,350 B1 * | 9/2001 | Shapiro | ................. | G06F 17/211 705/26.1 |
| 6,370,535 B1 * | 4/2002 | Shapiro | ................. | G06F 17/211 705/27.1 |
| 6,381,608 B1 * | 4/2002 | Savoie | ................. | G11B 27/034 715/726 |
| 6,564,380 B1 * | 5/2003 | Murphy | ................. | H04N 7/147 348/207.11 |
| 7,035,468 B2 * | 4/2006 | Yogeshwar | ......... | G06F 17/3028 382/232 |
| 7,263,666 B2 * | 8/2007 | Corl | ...................... | G06F 9/4443 715/707 |
| 7,668,928 B2 * | 2/2010 | Newnam | ................ | G06Q 30/02 709/216 |
| 8,214,386 B2 * | 7/2012 | Shapiro | ................. | G06F 17/211 707/770 |
| 8,375,073 B1 * | 2/2013 | Jain | ...................... | G06F 17/3053 707/729 |
| 8,380,710 B1 * | 2/2013 | Finne et al. | .................. | 707/723 |

(Continued)

*Primary Examiner* — Apu Mofiz
*Assistant Examiner* — Sheryl Holland
(74) *Attorney, Agent, or Firm* — Fish & Richardson P.C.

(57) ABSTRACT

The present disclosure relates to computer-implemented methods, computer-readable media, and computer systems for providing an intelligent news management platform and social media platform services. One computer-implemented method includes collecting detection data, extracting event data from the collected detection data, prioritizing the extracted event data to created prioritized event data, scoring the prioritized collected event data against a newsworthiness threshold to create scored event data, associating the score with the scored event data, storing the scored event data into an event data store, determining that the scored event data is at least equal to the newsworthiness threshold, marking the scored event data as actionable, and reporting the scored event data.

20 Claims, 10 Drawing Sheets

(56) References Cited

U.S. PATENT DOCUMENTS

| | | | | |
|---|---|---|---|---|
| 8,386,954 | B2* | 2/2013 | San Jule | H04N 5/44543 |
| | | | | 715/781 |
| 8,429,287 | B2* | 4/2013 | Sullivan | H04N 7/24 |
| | | | | 370/213 |
| 8,726,187 | B2* | 5/2014 | Snyder | G06F 3/0481 |
| | | | | 715/810 |
| 2002/0054244 | A1* | 5/2002 | Holtz | G06F 3/0481 |
| | | | | 348/722 |
| 2005/0251383 | A1* | 11/2005 | Murray | G06N 5/04 |
| | | | | 704/9 |
| 2008/0300872 | A1* | 12/2008 | Basu | G06F 17/30017 |
| | | | | 704/235 |
| 2009/0028306 | A1* | 1/2009 | Rhie | H04L 12/5835 |
| | | | | 379/93.01 |
| 2009/0034630 | A1* | 2/2009 | Cho | H04N 21/2146 |
| | | | | 375/240.27 |
| 2009/0265328 | A1* | 10/2009 | Parekh et al. | 707/5 |
| 2010/0142516 | A1* | 6/2010 | Lawson | H04M 7/0021 |
| | | | | 370/352 |
| 2010/0146042 | A1* | 6/2010 | Kruhoeffer | G06Q 30/02 |
| | | | | 709/203 |
| 2010/0161591 | A1* | 6/2010 | Jones et al. | 707/722 |
| 2011/0167054 | A1* | 7/2011 | Bailey et al. | 707/710 |
| 2012/0185463 | A1* | 7/2012 | Lim | G06F 17/30256 |
| | | | | 707/722 |

* cited by examiner

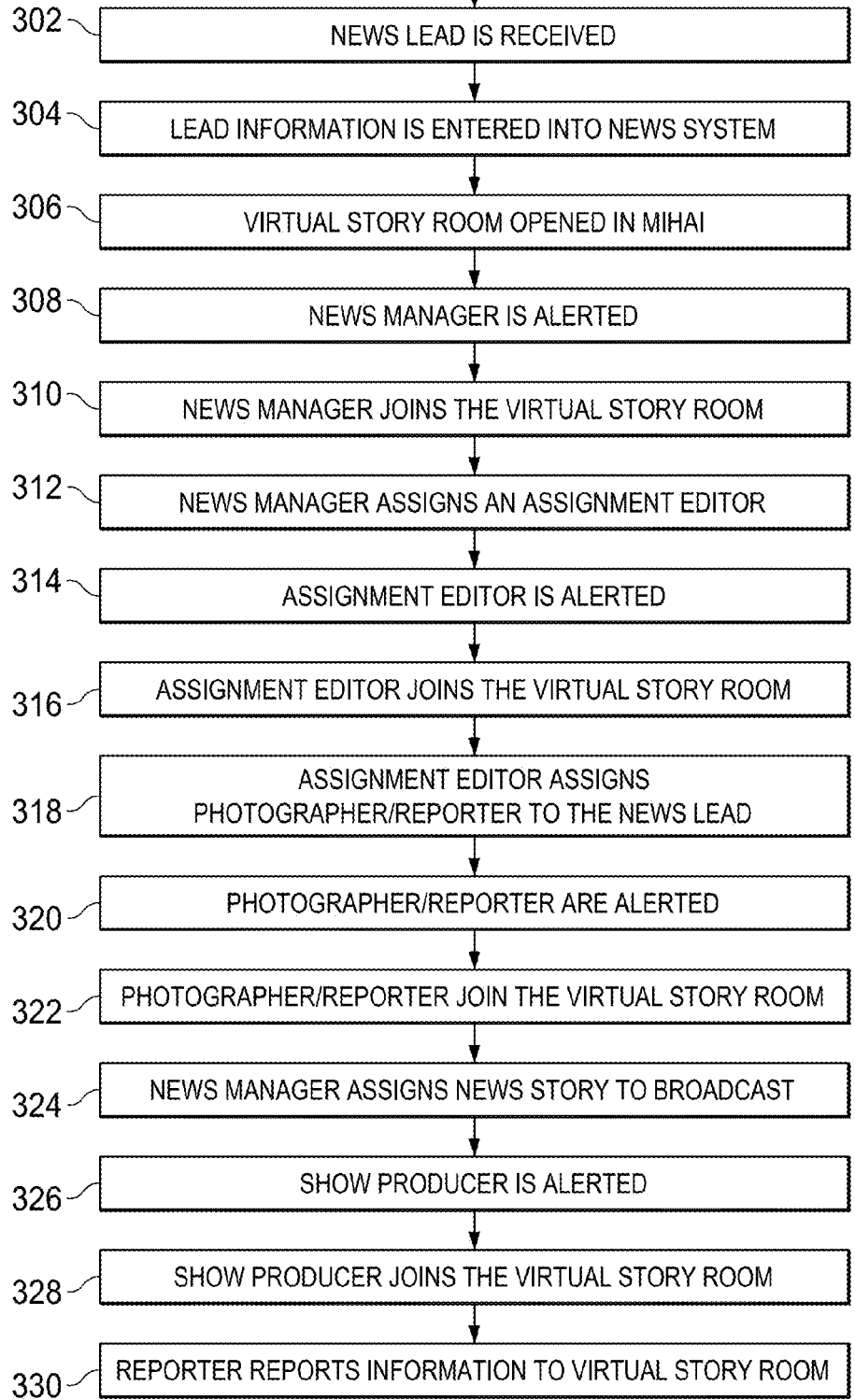

BikerArrest

[Join] [Srch] [New]

INTERNAL UPDATE to Group Members

Spoke to Dallas Sheriff PIO. Says deputy got 38 days suspension. Can appeal punishment. #BikerArrest #wfaanews -3

[Twitter] [Facebook] [Web] [Assign Today]
[+ Picture] [+ Doc]

FEED

From: @Reporter2 9/16/12 10:03a Spoke to Dallas Sheriff PIO. Says deputy got 38 days suspension. Can appeal. @DESK #BikerArrest  [T][F][W][A]

From: @NewsDirector 9/16/12 9:53a @Reporter1 Ask PIO about the length of the suspension. #BikerArrest  [T][F][W][A]

From: @Reporter1 9/16/12 9:51a Headed to Dallas Sheriff's Office now. #BikerArrest  [T][F][W][A]

From: @6pmProducer 9/16/12 9:15a @Reporter1 I'm thinking about this for lead story. #BikerArrest  [T][F][W][A]

From: @Reporter1 9/16/12 10:03a @6pmProducer, think this will make your show? #BikerArrest  [T][F][W][A]

iNews UI

| Location | 5pm | 6pm | 10pm |
|---|---|---|---|
| Crew | Live | PKG | Vo/Sot |
| Live Truck | Crew | Truck | Tapes |
| All Assign Today Updates | GFX | File | Y |

| Monday, June 4, 2012 | | | | | |
|---|---|---|---|---|---|
| #BikerArrest | 5 | Reporter | Photog | Editor | Truck |
| #BankRobbery | 6 | Reporter | Photog | Editor | Truck |
| #MayorsSummit | 5 | Reporter | Photog | Editor | Truck |
| #FirstDaySchool | 6 | Reporter | Photog | Editor | Truck |
| #PerryDallas | 10 | Reporter | Photog | Editor | Truck |

| Monday, June 4, 2012 | | | | | |
|---|---|---|---|---|---|
| #BikerArrest | 5 | Reporter | #DirkSpeaks | 6 | Reporter |
| #BankRobbery | 5 | Reporter | #SMUPresser | 5 | Reporter |
| #MayorSummit | 6 | Reporter | #SemiFlips | 6 | Reporter |
| #FirstDay | 6 | Reporter | #DoubleHorn | 5 | Reporter |
| #PerryDallas | 5 | Reporter | #iPhoneRelease | 6 | Reporter |

FIG. 4C

INTELLIGENT NEWS MANAGEMENT PLATFORM AND SOCIAL NETWORK

BACKGROUND

In modern news media, coverage of breaking news is inefficient and driven by human intelligence and manual information gathering, analysis, correlation, and reporting. There is no way to efficiently and in automated manner to harvest massive volumes of information from various sources of real-time data that may identify news events, report and/or correlate the real-time data with other various available data sets, and provide a near-real time dynamically changing news report to the news media market, institutional clients, and subscribers. Without an effective and cost-effective gathering, analysis, correlation, and reporting process and system, newsrooms continuously struggle to stay on top of dynamic local, regional, and global events and to provide necessary information to compete against other news organizations both financially and in terms of news freshness/depth.

SUMMARY

The present disclosure relates to computer-implemented methods, computer-readable media, and computer systems for providing an intelligent news management platform and social media platform services. One computer-implemented method includes collecting detection data, extracting event data from the collected detection data, prioritizing the extracted event data to create prioritized event data, scoring the prioritized collected event data against a newsworthiness threshold to create scored event data, associating the score with the scored event data, storing the scored event data into an event data store, determining that the scored event data is at least equal to the newsworthiness threshold, marking the scored event data as actionable, and reporting the scored event data.

The foregoing and other implementations can each optionally include one or more of the following features:

A first aspect, combinable with the general implementation, further comprising identifying data related to the scored event data.

A first aspect, combinable with the general implementation, further comprising determining that data related to the scored event data is found.

A first aspect, combinable with the general implementation, further comprising enhancing the prioritized event data to create enhanced event data.

A first aspect, combinable with the general implementation, wherein the enhancement raises the score of the prioritized event data.

A first aspect, combinable with the general implementation, further comprising re-scoring the enhanced event data.

The subject matter described in this specification can be implemented in particular implementations so as to realize one or more of the following advantages. First, the intelligent news management platform and social media platform will provide efficient, automated gathering of various available other multimedia data sets, analysis of the data, correlation of the data with additional available, and reporting of the analyzed and correlated data as news events. Second, the intelligent news management platform and social media platform will lower a news-gathering organization's overall cost of producing and disseminating news. Third, analyzed data can be correlated with existing multimedia data sets to create additional reportable news events potentially of interest to a customer. Third newsrooms can be streamlined due to automated and repeatable processes that gather, analyze, and correlate data to present to newsroom decision makers. Fourth, news may be continuously and cost-effectively reported with an ability to choose a level of desired news granularity at any time. Fifth, correlated data provides an additional revenue stream for a news organization. Produced correlated data may be of interest to various governments, organizations, groups, etc. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 is a flow chart of an example method for a newsroom social network process flow according to an implementation.

FIGS. 4A-4D illustrate various example graphical user interface implementations for a newsroom social network in accordance with some implementations of the present disclosure.

Like reference numbers and designations in the various drawings indicate like elements.

DETAILED DESCRIPTION

The present disclosure relates to computer-implemented methods, computer-readable media, and computer systems for providing an intelligent news management platform and social media platform services.

Figure 1:
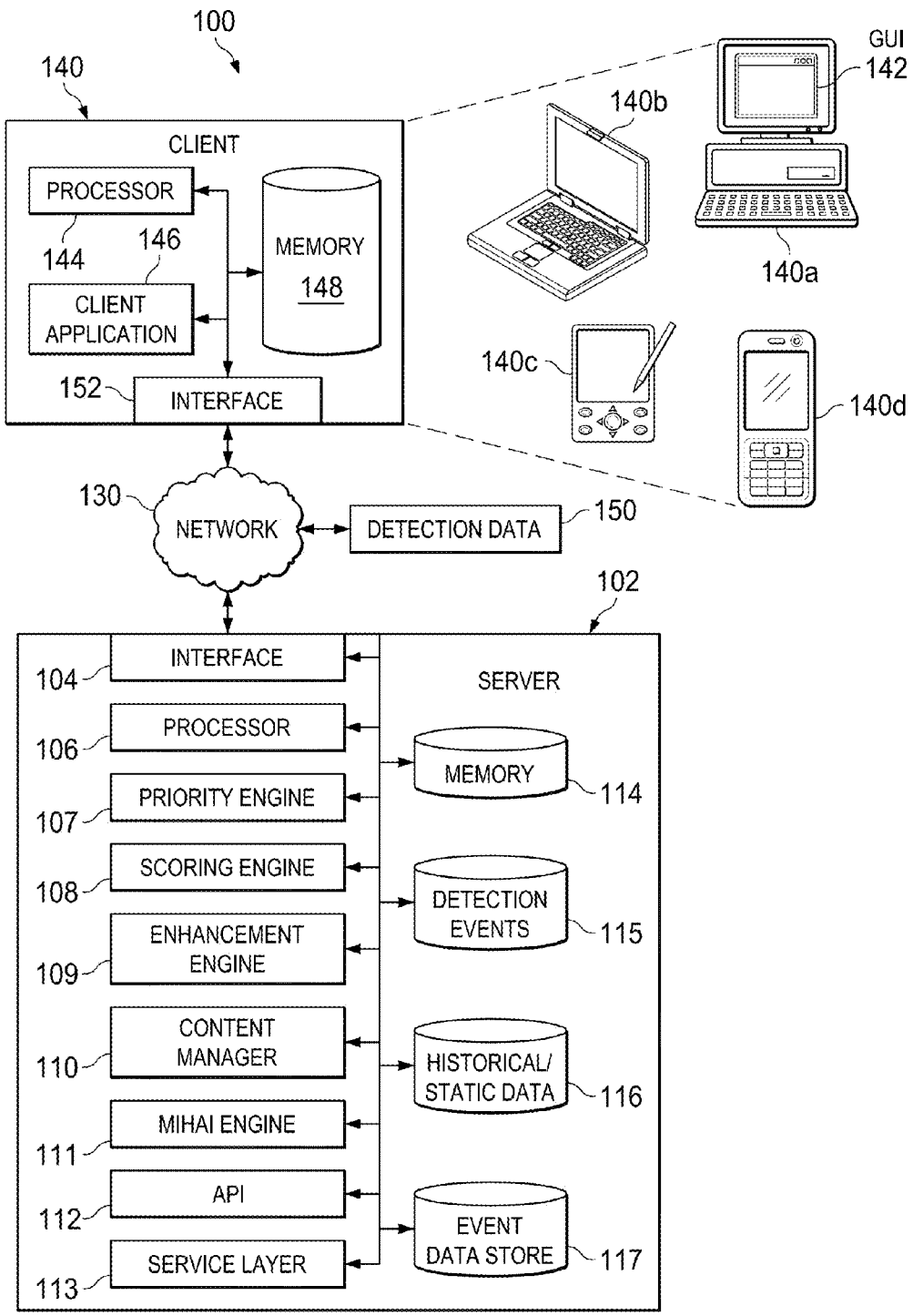
FIG. 1 is block diagram illustrating a system for providing an intelligent news management platform and social media platform services according to an implementation.

Turning now to FIG. 1, FIG. 1 is a block diagram illustrating an example distributed computing system 100 according to an implementation for providing an intelligent news management platform and social media platform services. The system 100 includes a server 102, clients 140*a-d* (collectively client 140), and detection data 150 communicably coupled through a network 130. In this implementation, each client 140 includes a GUI 142 for displaying information associated with the system.

Detection data 150 can be considered any type of multimedia data that can be accessed and processed. For example, detection data may include radio scanner broadcasts, radio transmissions, cellular transmissions, television transmissions, social media (messages, websites, web pages, etc.), Government weather data and emergency broadcasts, weather station data, Web search results, competitor monitoring, emails, utility operations status data, private organization emergency broadcasts, and other suitable data. Detection data 150 can be considered both raw data and data that is processed in some way prior to detection by the example distributed computing system 100. In some implementations, the detection data 150 is processed to extract subunits of data, "event data," for further downstream processing. In some implementations, the detection data 150 may be collected in data storage as a collection of detection events 115. The data storage may be a file, database, optical storage, or other suitable data storage. Although illustrated as a single component, the detection data 150 may come from multiple sources. The detection events 115 may also be divided into one or more data storages either local or remote to the example distributed computing system 100.

At a high-level, the server 102 includes an interface 104, a processor 106, and a memory 114. Although illustrated as a single interface 104 in FIG. 1, two or more interfaces 104 may be used according to particular needs, desires, or particular implementations of the example distributed computing system 100. The interface 104 is used by the server 102 for communicating with other systems in a distributed environment—including within the example distributed computing system 100—connected to the network 130; for example, the client 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The server 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the server 102. Specifically, the processor 106 executes the functionality required to provide an intelligent news management platform and social media platform services.

The server 102 also includes a memory 114 that holds data for the server 102 and various processes operating on the server 102. Although illustrated as a single memory 114 in FIG. 1, two or more memories may be used according to particular needs, desires, or particular implementations of the example distributed computing system 100. While memory 114 is illustrated as an integral component of the server 102, in alternative implementations, memory 114 can be external to the server 102 and/or the example distributed computing system 100.

The server 102 also contains one or more instances of a priority engine 107, a scoring engine 108, an enhancement engine 109, a content manager 110, a MIHAI engine 111, detection events 116, historical/static data 116, and/or an event data store 117. While illustrated as integral components of the server 102, in alternative implementations, these one or more instances can be external to the server 102 and/or the example distributed computing system 100.

The priority engine 107 prioritizes event data. In some implementations, the event data is prioritized based upon the source of the event data. For example, event data from a Government emergency broadcast may be provided a higher priority than a local private college campus alert system event data. In other implementations, the event data can be prioritized using any suitable attribute associated with the detection data and/or the event data.

The scoring engine 108 scores the prioritized event data against one or more newsworthiness thresholds. In some implementations, the scoring can ensure that the prioritized event data is between two specific thresholds, for example X and Y as (X=<prioritized event data<=Y). As will be appreciated by those of skill in the art, various other scoring methods are envisioned consistent with this disclosure. In some implementations, a scored prioritized event can be placed into one or more event data store 117 "buckets," for example "dismissed events," "unverifiable events," and/or "actionable events." The event data store may be any type of data structure storage, for example one or more databases, that are used to categorize event data once score by the scoring engine. If a scored event is scored as "actionable," it is sent to the social media platform for reporting.

The enhancement engine 109 is used to take an initially scored event that is below the newsworthiness threshold and to compare, verify, contrast, etc. the event against other detection data (e.g., detection events 115), historical/static public data 116 (e.g., criminal background, property data, calls for emergency service, etc.) to "enhance" its newsworthiness score to allow it to be considered "actionable" upon a re-scoring action by the scoring engine 108. The historical/static public data 116 may be a file, database, optical storage, or other suitable data storage. The scored event data may be shuffled among other non-actionable event data store 117 buckets. In some implementations, scored/re-scored event data may "time out" after a certain period of time or number of re-scoring attempts and be discarded, demoted in score, or other suitable action.

The content manager 110 is any type of application that manages the flow of content within the example distributed computing system 100. For example, in some implementations, the content manager 110 can allow the client 140 to request, view, add, edit, and/or delete content on the client 140 and/or server 102 after obtaining content from the server 102 in response to a received request from the client 140 and/or as result of receiving a content push from server 102. In some implementations, the content manager 110 allows connections to various other content providers (not illustrated) apart from server 102 and enables a user to view, add, edit, and/or delete content associated with the server 102 and/or the various other content providers. In some implementations, the content manager 110 can also interface with the MIHAI engine 111 (described below) to provide content associated with various newsroom social network graphical user interfaces. In some implementations, the content manager 110 can interface with any other element of the example distributed computing system 100 in order to receive and/or push content both within and/or outside of the example distributed computing system 100.

In some implementations, the content manager 110 can use content manager data (not illustrated) to perform tasks associated with the server 102 or other components of the example distributed computing system 100. Content manager data may include any type of data associated with and/or used by the content manager 110, including content provider locations, addresses, storage specifications, content lists, access requirements, or other suitable data. For example, for a database content provider, the content provider manager data may include the server Internet Protocol (IP) address, URL, access permission requirements, data download speed specifications, etc.

The content manager 110 can be any application, program, module, process, or other software. For example, the content provider manager 107 may be a web application, a business application, and/or other suitable application consistent with this disclosure. Additionally, a particular content manager 110 may operate in response to and in connection with at least one request received from other content managers 110, including a content manager 110 associated with another server 102. In some implementations, the content manager 110 can be and/or include a web browser. In some implementations, each content manager 110 can represent a network-based application accessed and executed using the network 130 (e.g., through the Internet, or using at least one cloud-based service associated with the content manager 110). For example, a portion of a particular content manager 110 may be a web service associated with the content manager 110 that is remotely called, while another portion of the content manager 110 may be an interface object or agent bundled for processing at a remote client 140. Moreover, any or all of a particular content manager 110 may be a child or sub-module of another software module (not illustrated) without departing from the scope of this disclosure. Still further, portions of the particular content manager 110 may be executed or accessed by a user working directly at the server 102, as well as remotely at a corresponding client 140.

The MIHAI engine 111 provides functionality for a real-time, open-/closed-circuit newsroom social media platform services (described in greater detail below). In some implementations the social media platform is Web based. The MIHAI engine 111 is responsible, among other things, for creating a graphical virtual story room with an associated graphical user interface for each actionable event relayed to it and/or recovered from the "actionable events" event data store 117. For example, the MIHAI engine 111 may monitor the "actionable events" event data store 117 and retrieve any actionable events for processing. In other implementations, another system component, for example the scoring engine 108, can indicate to the MIHAI engine 111 that an actionable event is present in the "actionable events" event data store 117 that needs to be retrieved by the MIHAI engine 111.

The MIHAI engine 111 can also permit newsroom personnel to comment on, prioritize, update, etc. the actionable event data within a virtual story room using at least a provided graphical user interface. Actionable event data may also be used by the MIHAI engine 111 to send alert messages to specific newsroom individuals, for example on computers, mobile devices, etc. The MIHAI engine 111 may also aggregate multiple virtual story rooms into a global graphical user interface view to permit newsroom personnel to make appropriate decisions based on all active actionable events.

In some implementations, any and/or all of components of the server 102, both hardware and/or software, may interface with each other and/or the interface using an application programming interface (API) 112 and/or a service layer 113. The API 112 may include specifications for routines, data structures, and object classes. The API 112 may be either computer language independent or dependent and refer to a complete interface, a single function, or even a set of APIs. The service layer 113 provides software services to the example distributed computing system 100. The functionality of the server 102 may be accessible for all service consumers using this service layer. Software services, such as those provided by service layer 113, provide reusable, defined business functionalities through a defined interface. For example, the interface may be software written in JAVA, C++, or other suitable language providing data in extensible markup language (XML) format or other suitable format. While illustrated as integrated components of the server 102 in the example distributed computing system 100, alternative implementations may illustrate the API 112 and/or service layer 113 as stand-alone components in relation to other components of the example distributed computing system 100. Moreover, any or all parts of the API 112 and/or service layer 113 may be implemented as child or sub-modules of another software module, enterprise application, or hardware module without departing from the scope of this disclosure.

The client 140 may be any computing device operable to connect to or communicate with at least the server 102 using the network 130. In general, the client 140 comprises a computer operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the server 102 as well as other systems (not illustrated) communicably coupled to the network 130. The interface 152 may also be consistent with the above-described interface 104 of the server 102 or other interfaces within the example distributed computing system 100. The processor 144 may be consistent with the above-described processor 106 of the server 102 or other processors within the example distributed computing system 100. Specifically, the processor 144 executes instructions and manipulates data to perform the operations of the client 140, including the functionality required to send requests to the server 102 and to receive and process responses from the server 102. The memory 148 may be consistent with the above-described memory 107 of the server 102 or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser and/or other application. Generally, through the GUI 142, an server 102 user is provided with an efficient and user-friendly presentation of data provided by or communicated within the example distributed computing system 100. In particular, the GUI 142 may be used to view and navigate various web pages located both internally and externally to the server 102 and to perform exposure management functions consistent with this disclosure.

There may be any number of clients 140 associated with, or external to, the example distributed computing system 100. For example, while the illustrated example distributed computing system 100 includes one client 140 communicably coupled to the server 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual information, or a GUI 142, as shown with respect to the client 140.

Intelligent News Management Platform (NewsHub)

The Intelligent News Management Platform ("NewsHub") provides an effective and cost-effective event data gathering, analysis, and correlation system acting on massive amounts of data. Events are gathered, extracted scored, analyzed for newsworthiness, enhanced, and indicated as actionable to the MIHAI newsroom social media platform.

The coverage of breaking news is the lifeblood of any news organization as viewers/users expect aggressive attention to reporting of events critical to their lives. NewsHub combines a newsroom's traditional reliance on human intelligence with a:
  Proprietary Algorithm (P/A) that identifies news events by sifting through a combination of currently available real-time data streams and new streams developed by NewsHub.
  Content Management System (CMS) allowing a variety of newsroom workers, from different disciplines (reporters, producers, anchors, managers) to access, collaborate, fact-check and improve upon the information identified by the P/A.
  User-Interface (U/I) allowing newsrooms to report more information at faster speeds and in more engaging ways.

NewsHub is a next-generation "News Service"—faster and more relevant than other large news organizations. NewsHub leverages real-time content developed by clients who using NewsHub and creates a single, robust newsfeed.

NewsHub also generates/increases revenue in at least two ways:
  Monthly Recurring License Fees, paid by newsroom customers, who run on the NewsHub platform and can opt-in to other premium services.
  Institutional "News Service" Client Fees charged to clients in the financial services industry and government agencies that need immediate access to high quality, real-time news information.

Figure 7:
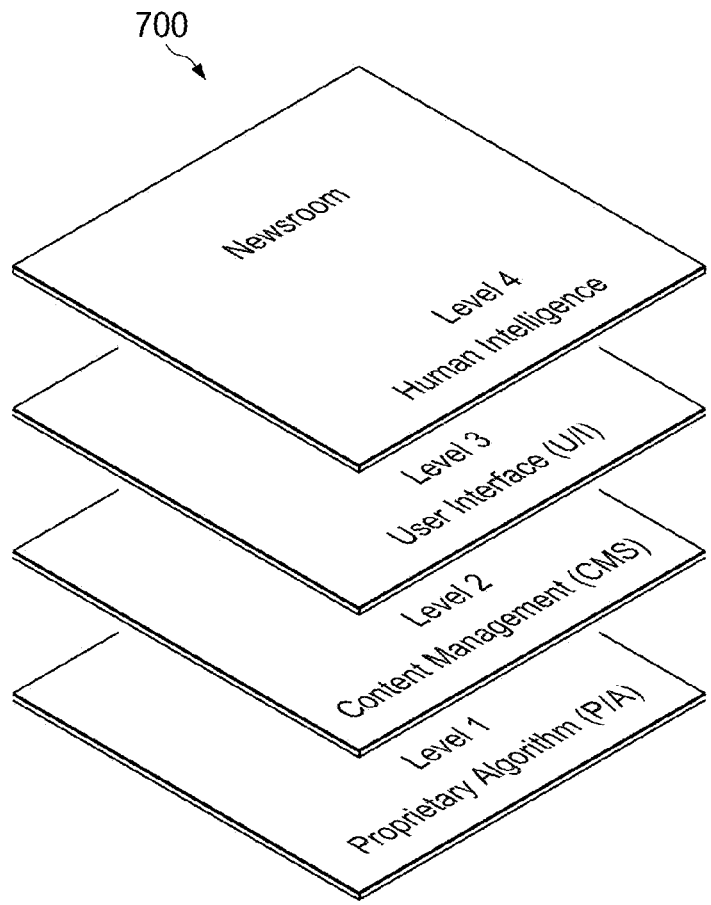
FIG. 7 illustrates example layers of a NewsHub system according to an implementation.

NewsHub is a multi-layered system. In some implementations, NewsHub may be layered. FIG. 7 illustrates example layers 700 of a NewsHub system according to an implementation. As will be apparent to those of skill in the art, in some implementations, various components associated with the illustrated layers can exist and operate, wholly or partially on other layers without departing from the scope of this disclosure.

Handling a News Event

The following is an example of how a typical news event is handled by a typical prior art newsroom:
  The primary way to monitor breaking news is by listening to police and fire scanners for newsworthy emergencies. The person covering the assignment desk, Jack, identifies a news event on a police radio.
  Jack stands up and yells to the rest of the newsroom about what he found.
  Jack enters the information in what is essentially a shared, word processing document.
  Jack begins to make calls about the event, adding information to the word processing document.
  A manager is alerted to the situation so she can decide what resources to marshal. Options range from doing nothing to sending multiple crews and launching a helicopter.
  Bill, the news anchor, scrambles to a camera, without any preparation, where he may not even have access to a computer terminal. Bill shouts to a producer, Maria, to come over and brief him. Maria relays to Bill what she heard from Jack and possibly from what she saw in the shared word processing file.
  Bill goes on TV without all of the newsrooms evolving information available at his fingertips and repeats the little bit of information he knows.
  Maria talks to Bill in his ear to update him about the latest information reported from the field, heard on a scanner or possibly found on a social media site/service.
  Meanwhile the graphics department scrambles to create a map of the location where news is happening so the anchor can have something to show.
  And the Web department personnel are running around the newsroom looking for scraps of information that they can add to their website and social media accounts.

NewsHub adds three distinct operations to the current way a typical newsroom functions:
  Level 1: Proprietary Algorithm (P/A)
  NewsHub brings science to the newsroom, a workplace that has traditionally relied solely on art to report news. Proprietary algorithms run 24/7, rapidly identifying newsworthy patterns by analyzing multiple streams of data for relevancy, in real time, and cross checking those streams against each other.

As an example, assume there's a massive tornado that ripped the roof off a fireworks factory—which might explode at any minute. The NewsHub algorithms will run through these data streams, for example, in this order of importance:
  STEP 1: Voice recognition of police, fire, and air traffic radio transmissions
  This is where NewsHub will first identify the damage to the factory. NewsHub records all radio transmissions and analyzes them through voice recognition software. Because there is an established hierarchy of codes used by emergency dispatchers, NewsHub can identify the importance of an event mentioned by an emergency dispatcher. Similar to police and fire transmissions, NewsHub can also identify the existence of a plane in trouble, by listening to air traffic control transmissions. All newsworthy radio transmissions are saved and pushed to the NewsHub Content Management System (CMS). This allows them to be played and re-played in a live broadcast or web posting—something that is not possible today.

STEP 2: Severe weather alerts

Checking against government-issued, severe weather alerts helps NewsHub confirm the likelihood of the voice recognition signal it has already received in STEP 1 (about damage to the fireworks building). NewsHub then associates the damage report, captured in STEP 1, to a specific area that crosschecks with the government-reported storm hitting that same area. Information about counties affected by severe weather will be pushed to the CMS for later use in a live broadcast.

STEP 3: Twitter, Facebook, Blogs, Google search terms

NewsHub scours Social Media looking for messages indicating the existence of a possible news event. In cases where a possible event has already been discovered through STEP 1, NewsHub sets us Social Media filters to focus on the general area of the occurring news event and/or references to the fireworks factory and the severe weather event. Social media messages, such as Tweets and photo postings are now pushed to the CMS.

STEP 5: Other radio transmissions of competing news outlets and their helicopters If NewsHub's voice recognition filters hear chatter from the radio transmissions of other news competitors, like the launch of a competing news helicopter, that further confirms the likelihood that the news event is occurring.

STEP 5: Traffic volumes on client's websites

In the event of severe weather or other major news, web traffic to a local news site can swell by 10-100-fold. For NewsHub this is another good confirmation that an event is taking place. Traffic volume data is then pushed the CMS.

STEP 6: Data generated by co-branded NewsHub mobile app users

NewsHub clients can share a mobile phone platform with their viewers—allowing the viewers to feed information back into the algorithm, based on their location. Similar to a TV station's network of trained weather spotters, an approved viewer may report news into the algorithm. Or, based on their proximity to the possible news event, a verified and trusted user may also be asked, by the algorithm, to provide additional information based on what they see or can photograph. Data is then pushed to the CMS.

STEP 7: Power grid outages

In the event of a major disaster, it is likely power service may be interrupted. NewsHub monitors power grid data for black outs, using that information as further verification of the storm. Outage data is then pushed to the CMS.

As a result of cross checking these data streams, NewsHub increases its ability to identify a news event and reduces the possibility that a live person will miss the action. Additionally, as NewsHub works through its system it quickly finds and saves valuable data that pushes to the CMS, vastly improving the amount of information available for a live broadcast or posting to the web.

Figure 8:
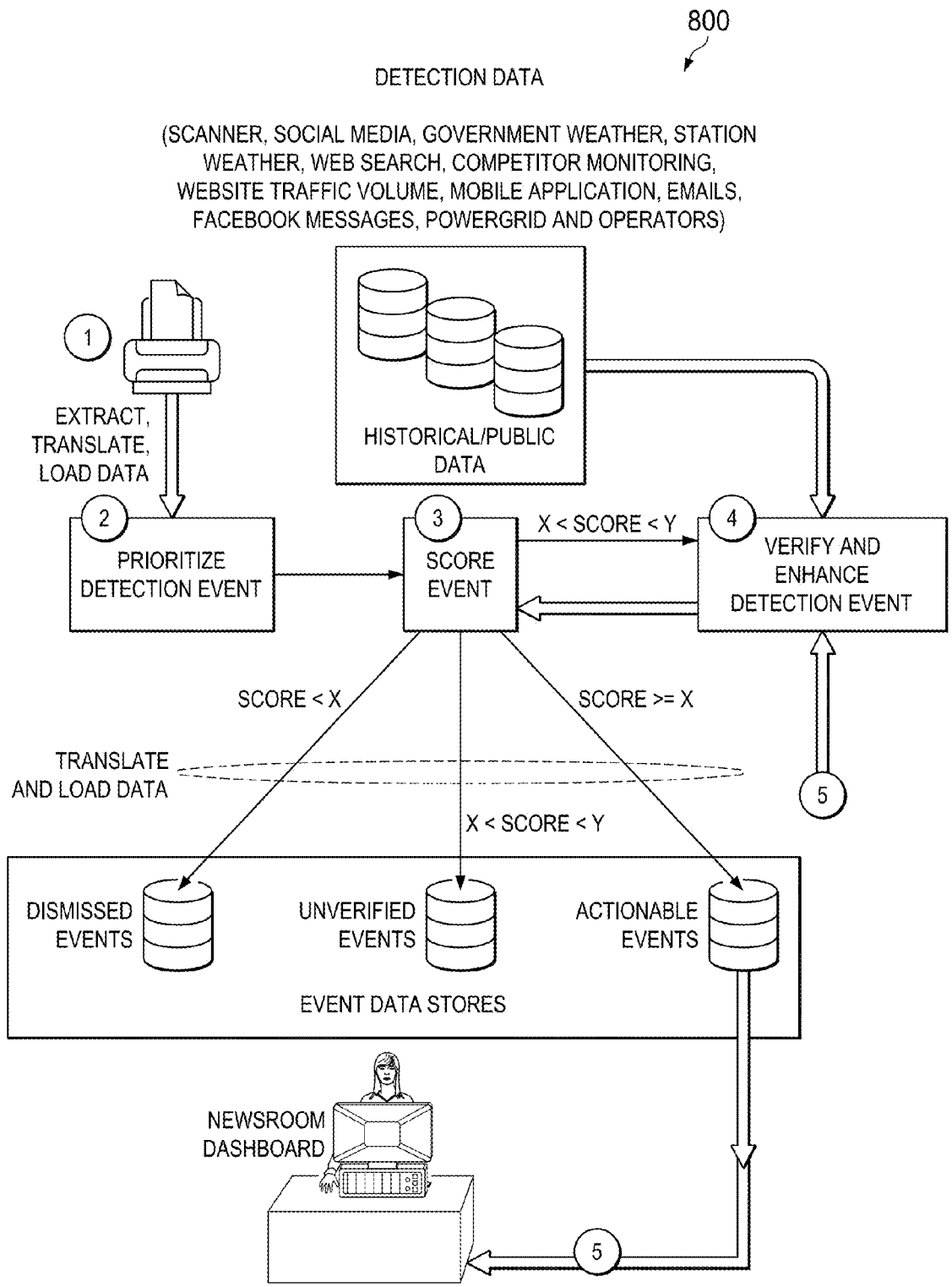
FIG. 8 is a flow chart of an example proprietary algorithm flow according to an implementation.

FIG. 8 is a flow chart of an example proprietary algorithm flow 800 according to an implementation. The flow, details, and associated data corresponding to indicated elements 1-5 are as follows:

1. Event data is collected from real time sources, for example:
   a. Police Scanner: Radio transmissions converted to text through speech recognition software.
   b. Fire Scanner: Radio transmissions converted to text through speech recognition software.
   c. EMS Scanner: Radio transmissions converted to text through speech recognition software.
   d. Air Traffic Control Scanner: Radio transmissions converted to text through speech recognition software.
   e. Social Media Data: Posts, by the public, on TWITTER, FACEBOOK, etc.
   f. NewsHub Mobile App users: App users submit information on news happening around them. Or, based on their GPS location, may be asked—by the app—to submit information about events happening around them.
   g. Government generated weather warnings: The National Weather Service is the authority on issuing severe weather alerts.
   h. TV station generated weather warnings: TV stations generate their own weather feeds, forecasts and warnings.
   i. Electricity demand data: Power grid operators provide real time data on electric demand and issue warnings when demand is too high.
   j. Power outages: Electric delivery companies, like ONCOR, track power outages in real time.
   k. Web "search term" data: During news events people enter search terms into search engines, like Google and Bing, to find out more about what's happening.
   l. Data from competing stations: Competing news outlets are a source of breaking news on TWITTER, FACEBOOK and their associated websites. Competitors with helicopters will launch them, through the use of two-way radio, to cover breaking news. Those transmissions are converted to text through voice recognition software.
   m. TV station web "traffic volume" data: During large news events traffic to news websites balloons as more people turn to news organizations to tell them what is happening.
   n. Facebook messages: Loyal viewers of a news organization will often send private messages to the organization, or its people, of newsworthy information or pictures.
   o. E-mail alerts: People who see news or respond to it, like the RED CROSS, may send updates via e-mail.

Extract, Translate, Load: The software searches through the above data sets looking for the following data to extract, translate, and load into searchable fields. For example, for a Police/Fire/EMS scanner, fields could include:
   i. Emergency code:
   ii. First name, last name, middle name
   iii. Data of birth
   iv. Event address
   v. Home address
   vi. Other suitable data.
2. Event data prioritized based on source of data.
3. Event scored against a newsworthiness threshold then stored as dismissed, unverified or actionable. If an event is scored as actionable it is sent to the newsroom.

4. If the initial event is below the threshold it's sent back through the detection data looking for other events that verify or enhance the original event. Initial event is also checked against static public data (criminal background, property values, and calls for service). Initial event is then rescored until it becomes actionable.

5. Event Data Stores are rechecked on a prescribed basis, with a frequency based on their score, in an effort to find new data that allows that event to cross the newsworthiness threshold. Or, in the case of an actionable event, the algorithm runs it through the data to continually enhance it with new, related data.

Level 2 (L2): Content Management System (CMS)

NewsHub vastly improves on the current state of the art by allowing a variety of newsroom workers, from different disciplines (reporters, producers, anchors, managers), to access, collaborate, fact-check and improve upon the robust information identified by the NewsHub's P/A.

Frequent turnover of newsroom personnel also means many newsrooms struggle to retain institutional knowledge. NewsHub helps mitigate the loss of institutional knowledge by remembering all the events it's covered, their relative importance, what caused them and how they were resolved. This ability to learn will continually improve NewsHub's functionality.

As an example, assume the P/A has identified the possibility that a major fire has broken out in an apartment complex. The CMS will:

Step 1: Create a file of the relevant information it has gathered
  Address, description from initial caller, location of fire or police station sending crews, # units dispatched to scene
  A manager will be asked to approve this information.
Step 2: Show manager's location of all news crews and live units and give distance and driving time to fire.
  Managers will be asked which crews to dispatch.
  Text messages with relevant info will be sent to those crews.
Step 3: Begin asking other resource-based questions, like:
  The helicopter can be on the scene in 19 minutes, do you want to send it? If the answer is yes, the helicopter crew gets an automatic text message with all the relevant information in the file.
  Do you want to cut into programming? If the answer is yes, the latest info is sent by text to news managers and members of the studio floor crew so they can prepare to broadcast.
  Should this information be posted on the web, tweeted, facebooked? If the answer is yes, those tasks happen automatically.
Step 4: Generate a list of relevant of phone numbers staff members should call to update the file.
  Local police, fire, hospitals, elected officials.
Step 5: Continually add new information, generated by the P/A and the newsroom staff.
  Managers will again be asked for approval to publish.
Step 6: Search for phone numbers for all homes and businesses in the area
  Users will be prompted to call these addresses, seeking updated information.
Step 7: Search paid public data services (ACCURINT, LEXIS-NEXIS) for information about any name or business captured by the P/A
  Names, addresses, business ownership, residential ownership
Step 8: Send Robocalls
  Institutions like the RED CROSS will get automated calls asking them to "Press 1 if they are sending emergency relief workers"

The L2 predictive analytics are able to determine if an event is newsworthy. For the sake of this discussion, L2 is analyzing police/fire department radio transmissions. However it could also be analyzing police radio, air traffic control radio, TWITTER, FACEBOOK, other social media sites, video, government weather data, government earthquake data, electric grid data, electric power generation data, and any other suitable data source.

Figure 9:
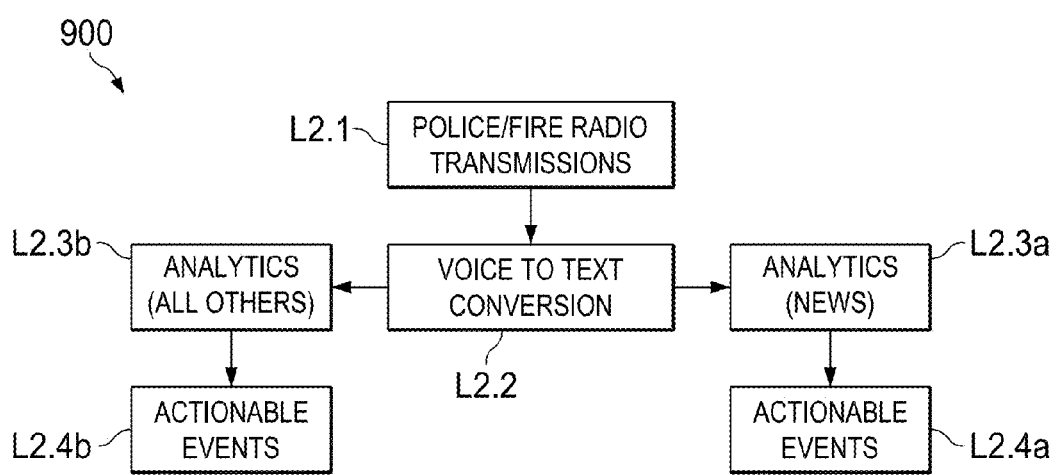
FIG. 9 is a flow chart of an example level 2 content management system workflow according to an implementation.

Turning now to FIG. 9, FIG. 9 is a flow chart of an example level 2 content management system workflow 900 according to an implementation. L2.1 shows fire radio as the incoming source, which is then converted from voice to text in L2.2. L2.3a shows that data is sorted for newsworthiness by L2's predictive analytics, which surfaces events shown in L2.4a, which are actionable for a media/news customer.

The same data same from L2.1 and converted to text in L2.2 can be sorted for non-news customers. For example a fire restoration company may be interested in knowing about fires at commercial properties of a certain value. We would set up a custom filter for them, seen here as L2.3b, which would render actionable events, pictured at L2.4b, which would be different, then what a news station would want in L2.4a.

Turning now to Table 1 (below), Table 1 generally refers to the types of information that can be collected and processed by the predictive analytics pictured in L2.3a and rendered, as a newsworthy event, in L2.4a. For example, were L2 is set to analyze the voice-to-text conversion of a radio transmission in L2.1, referencing smoke coming from a building. It will collect, but is not limited to, some of the following key word information found in Table 1, Column A:
  1. Jurisdiction
  2. Type of Call (smoke, chemical, fire, fumes, roof, explosion, care accident, fully-involved, injury—minor, injury—major, injury—multiple)
  3. Equipment called out to respond (Ladders, Engines, Utility Trucks, Search and Rescue, Ambulance, Helicopter)
  4. Address of the incident.
  5. Type of Structure (industrial, single family, multi-family, commercial, educational, athletic venue, retail, government, infrastructure, public spaces, water)
  6. Date and Time of incident
  7. Tone of Voice of dispatcher of responding units in the field (calm, stressed, out of breath)

Based on some of this initial data, L2 can already make some preliminary decisions on newsworthiness. For example, Table 1, 2G may indicate a major car accident; Table 1, 4A may indicate the location as a major freeway; Table 1, 6B may indicate that accident is during rush hour while Table 1, 7C may indicate a first responder is out-of-breath, a sign of a possible rescue. L2 will recognize that a major accident, on a major freeway, at rush hour with a possible rescue underway is very newsworthy and render it as an "Actionable Event" in L2.4a.

The predictive analytics of L2 may also layer additional information on top of the hard facts gathered from a radio transmission. For example, L2 gathers info from Table 1, 2C indicating a fire. The address of that fire is indicated in Table 1, 4A and the fact that this location is a single-family residence is gathered in Table 1, 5b. Given that information, L2 checks with local tax records database in Table 1, 4a, and discover the home is worth 1 million dollars. Finally, a further search in Table 1, 4c shows that one of the neighbors is the Mayor of Dallas. By adding value to basic facts collected, L2 would again render this as news.

There are multiple possible combinations that L2 will recognize as a pattern leading to an "Actionable Event" in L2.4a.

TABLE 1

| Info Collected (Column A) | | Subsets (Column B) | | Database Check (Column C) |
|---|---|---|---|---|
| 1 | WHO | | | |
| A | Jurisdiction | a Jurisdiction sub-division | aa | Socio-Economic Census Data |
| 2 | CALL TYPE (key words) | | | |
| A | smoke | | | |
| B | flames | | | |
| C | fire | | | |
| D | fumes | | | |
| E | roof | | | |
| F | explosion | | | |
| G | car accident | | | |
| H | fully involved | | | |
| I | Injury | i Minor | | |
| | | j Serious | | |
| | | k Multiple | | |
| 3 | EQUIPMENT | | | |
| A | Ladder | | | |
| B | Engines | | | |
| C | Utility | | | |
| D | Search and Rescue | | | |
| E | Ambulances | | | |
| F | Helicopter | | | |
| 4 | WHERE | | | |
| A | Address | a Taxable value | aa | Socio-Economic Census Data |
| | | b Resident | bb | Historical location information |
| | | c Neighbors | cc | Central Appraisal District |
| | | d Census Data | | |
| | | e Urban, suburban, exurban | | |
| 5 | TYPE OF STRUCTURE | | | |
| A | industrial | a chemical, light manufacturing, heavy manufacturing | aa | FD List of Hazardous Locations |
| B | single-family residential | b home, condo | | |
| C | multi-family residential | c condo, apartment, high rise, duplex | | |
| D | commercial | d office high rise, office building | | |
| E | educational | e day care, elementary, middle, high school, vocational, higher ed, | | |
| F | athletic venue | f HS stadium, college stadium, professional stadium, arenas | | |
| G | retail | g malls, strip malls, retail districts (bishop arts, uptown) | | |
| H | government building | h city, county, state, federal | | |
| I | infrastructure | i bridges, power plants, power grid... | | |
| J | religious institution | j churches, synagogues, mosque, etc.-- and their schools | | |
| K | public spaces | k public parks, gathering space, | | |
| L | water | l lakes, rivers, streams | | |
| 6 | DATE & TIME | | | |

TABLE 1-continued

| Info Collected (Column A) | | Subsets (Column B) | | Database Check (Column C) |
|---|---|---|---|---|
| A | Date | a Business Day (M-F) | aa | Special Events |
| B | Time | b Weekend Day (Sat-Sun) | | |
| | | c Holiday | | |
| | | d Special Events | | |
| | | e School in session (pick up, drop off) | | |
| | | f Rush Hour | | |
| | | g Church | | |
| | | h Bar Closing Time | | |
| 7 | Tone of Voice | | | |
| | | a calm | | |
| | | b stressed | | |
| | | c out of breath | | |

Level 3: User Interface (U/I)

The User Interface pulls in approved data from the CMS and becomes NewsHub's finished and polished work product. It's what the public sees and experiences. Better and faster breaking news information is now at the fingertips of a client's news organization. NewsHub allows for the processing of this information in two ways: live television coverage and web stories written by a computer program.

1. LIVE TELEVISION DASHBOARD: A news anchor, tasked with sharing breaking news coverage with his audience, can now interact—live—with a large touch screen dashboard powered by NewsHub data.

MAP: At the center of the dashboard is a 3-D Earth Map, for example a GOOGLE map. This gives a viewer a sense of place and, for example, can track the path of live police chase.

MODULES: Around the outside of the map are information modules with data collected through the NewsHub system. Modules will include:

Radio transmission audio files. The anchor can play and replay these manager-approved, recorded transmissions to the audience, as part of his coverage. Something that is not possible today. These transmissions can be tied into the relevant locations on the Google Earth map.

Social media postings: The anchor can call up manager-approved postings, photos and videos found on sites like Twitter and Facebook. These posts will also be tied into the Google Earth map showing where they were created.

Trending Twitter topics and Google search terms

Updated Severe Weather Alerts—tied to map locations

Manager-approved information reported from approved viewers using the NewsHub mobile phone app, tied to map locations.

Locations of power outages, tied to map locations

Data reported from a station's news crews, in the field, tied to map locations as they information starts coming in.

2. COMPUTER-WRITTEN WEB STORIES: A company called NARRATIVE SCIENCE has developed software that writes news stories based on available information. By interfacing NewsHub with NARRATIVE SCIENCE, it is possible to generate instantly written and constantly updated stories. After the copy is approved by a manager it can immediately be posted to a client's website, TWITTER account, FACEBOOK page and sent to the news anchor who is live on the air. In addition, these stories will create the backbone of the NewsHub "News Service" feed that can be sold to institutional clients.

Figure 2:
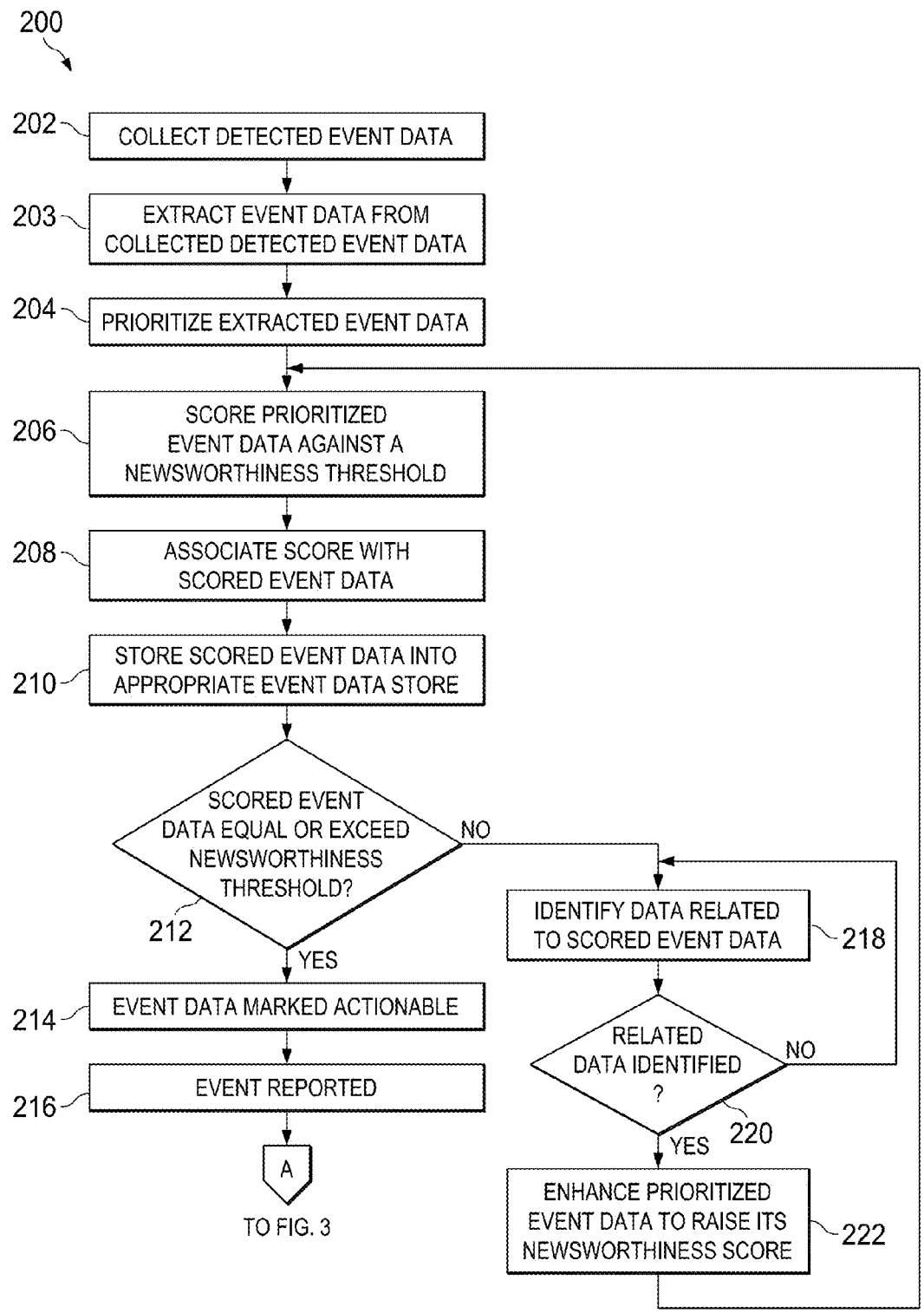
FIG. 2 is a flow chart of a method for intelligently managing event data according to an implementation.

FIG. 2 is a flow chart of a method 200 for intelligently managing event data according to an implementation consistent with the disclosure above related to the NewsHub Intelligent News Management Platform. Method 200 may be performed by any other suitable system, environment, software, and hardware, or a combination of systems, environments, software, and hardware as appropriate. In some implementations, elements of method 200 may be combined and/or rearranged in any manner consistent with this disclosure.

MIHAI Newsroom Social Media Platform

As described above, the MIHAI engine 111 provides functionality for a real-time, open-/closed-circuit newsroom social media platform services enhancing communication and sharing of data/information, inside a news organization. The MIHAI engine 111 creates a graphical "virtual story room" for each piece of news content developed/indicated as actionable by NewsHub and/or the news organization. The virtual story rooms allow staff members with various responsibilities to interact and share critical updates with everyone, at once, in real time. In some implementations, the staff members can share virtual story room updates to Twitter, Facebook and various private and/or public websites. The MIHAI engine 111 also interfaces with and sends/receives updated information to and from the organization's newsroom computer system, such as NEWS or other suitable newsroom computer system. The ability of the MIHAI engine 111 to interface with other computer systems, allows the MIHAI engine 111 (and associated server 102 components) and the other computer systems to complement and update each other.

An example process flow for MIHAI could be:
An assignment editor hears about a gas line explosion news lead and enters it into the INEWS computer system.
INEWS opens a virtual story room for the gas line explosion in MIHAI.
MIHAI alerts the news manager through a message sent to a mobile/desktop device.
The news manager joins the virtual story room.
Through MIHAI, the lead manager assigns an assignment editor.
The assignment editor is alerted through a message sent to a mobile/desktop device.
Assignment editor joins the virtual story room.
The assignment editor assigns a reporter and photographer to the gas line explosion news lead.
Reporter and photographer each received an alert on mobile/desktop devices
Reporter and photographer join the virtual story room.
The news manager assigns the developing gas line explosion story to a particular news broadcast managed by a show producer.
The associated show producer is alerted on a mobile/desktop device.
The show producer joins the virtual story room.
The reporter arrives on the scene of the gas line explosion and sends a message to the virtual story room about events at the scene. MIHAI gives the reporter an option to share information to social media, websites, etc.
If the news manager moves the story in INEWS to a different news broadcast, for example an hour earlier, on MIHAI everyone is alerted and new news personnel are invited to join the virtual story room.
If the photographer needs to be changed, or the reporter is assigned to a different story everyone in the virtual story room is updated. All virtual story rooms can be arranged into a global view onto a single big display in the newsroom. In this way, all decision makers can see everything at once: what is being covered, location of news crews, what reporters are saying on social media, which stories are in which shows. Producers, digital editors, reporters, and assignment managers, etc. can arrange a personal global view in the virtual story room to highlight the information that matters most to them.

FIG. 3 is a flow chart of an example MIHAI newsroom social network process flow 300 according to an implementation consistent with the disclosure above related to the MIHAI newsroom social network platform.

FIGS. 4A-4D illustrate various example graphical user interface implementations 400a-400d for a newsroom social network in accordance with some implementations of the present disclosure.

Although FIGS. 4A-4D illustrate one or more particular graphical user interface implementations, those skilled in the art will appreciate that FIGS. 4A-4D represent only possible implementations of a multitude of possible graphical user interface implementations to accomplish similar desired functionality. This disclose anticipates other possible implementations not inconsistent with this disclosure for usability, efficiency, practicality, cost, maintenance, and/or or other suitable reasons.

FIG. 4A represents a "story room" where users can update story information to share with other members of the newsroom and/or post content to social media networks. In addition to a text-based update, a user can attach a relevant document or picture to be shared. FIG. 4A also includes a feed showing recent updates made inside the story room. FIG. 4A also shows basic information related to the staffing and utilization of the story. For example, who are the staff assigned, what equipment is in use (e.g., a live truck) and also a space for a longer narrative telling what the story is about.

FIG. 4B illustrates an alternate display of information. In particular, information typically displayed at a news assignment desk. Seen here are the "story slug", the newscast the story is assigned to, and crew assignments (reporter, photographer, editor, truck). This information automatically updates as changes are made in a story room, or vice versa.

FIG. 4C illustrates how the information is typically displayed at an editorial meeting where ideas are suggested by staff members and then staff is assigned to the story. Opening a new story slug in this view will automatically open a new "story room."

Figure 4D:
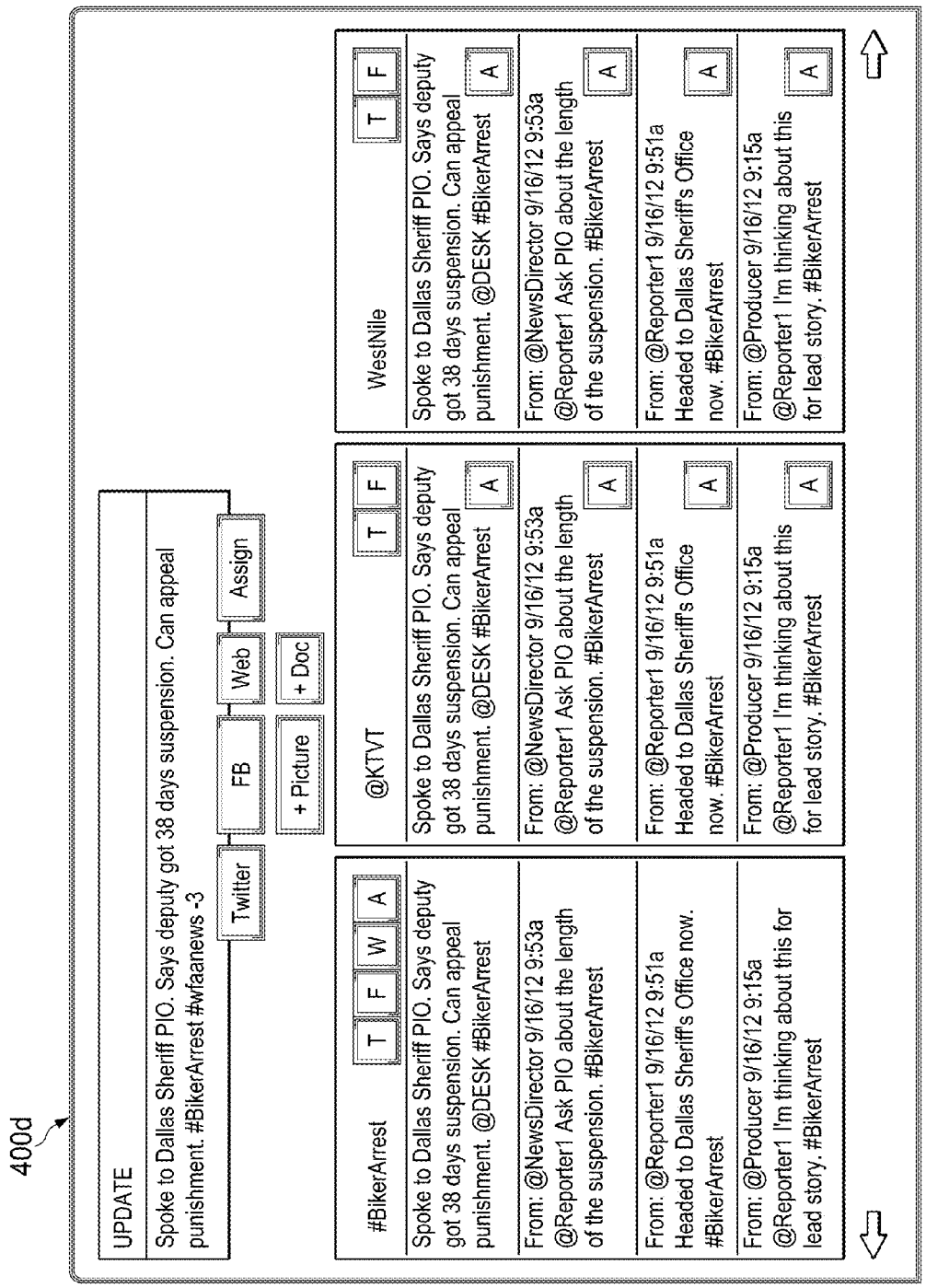
Figure 5:
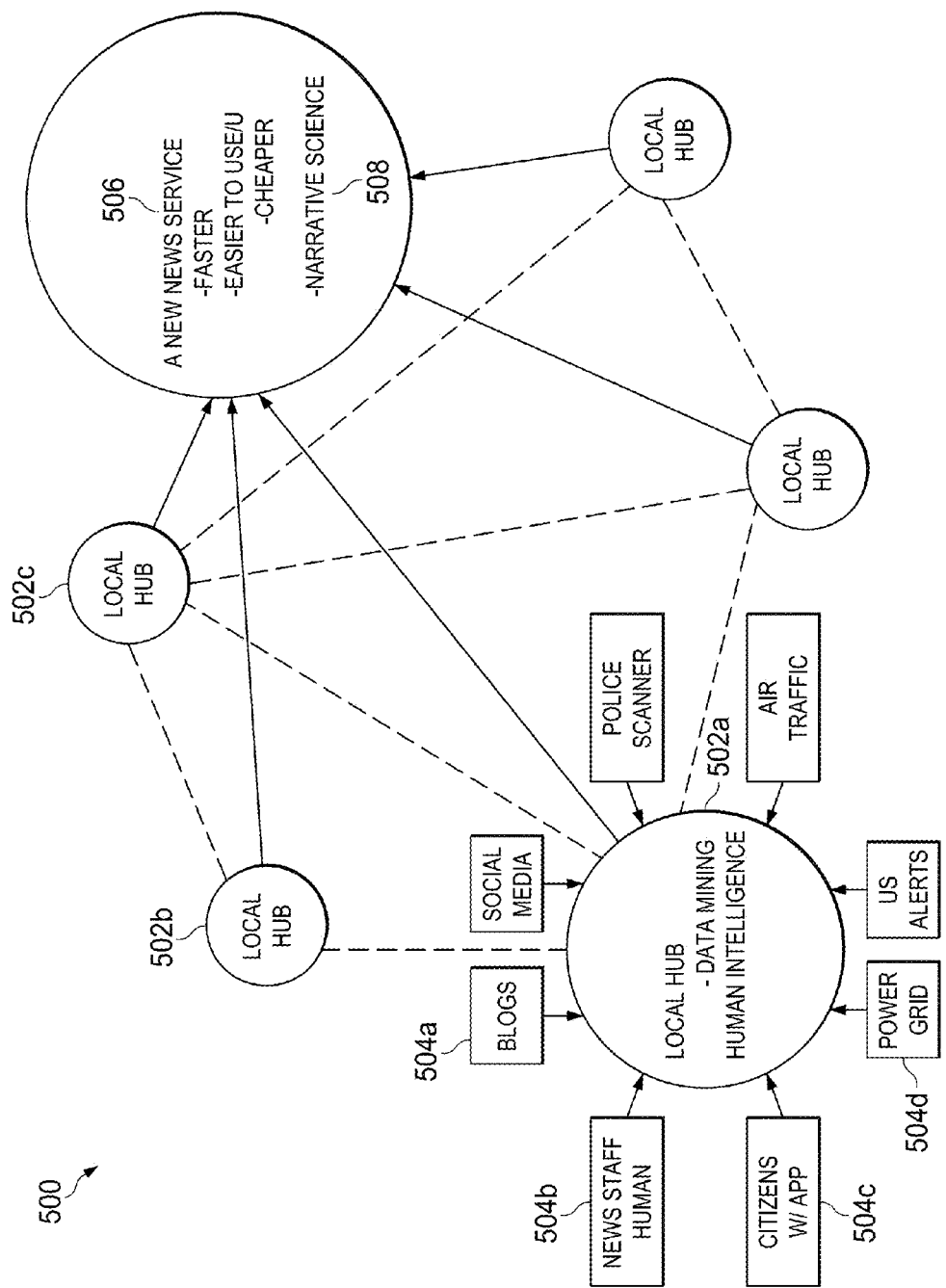
FIG. 5 is a block diagram illustrating a distributed intelligent news management platform and newsroom social media platform services according to an implementation.

FIG. 4D illustrates a user's ability to monitor multiple story rooms at a given time, on a single screen. Users may also monitor streams beyond this system, pulling in TWITTER, FACEBOOK, and/or other social media feeds FIG. 5 is a block diagram illustrating a distributed intelligent news management platform (NewsHub) and newsroom social media platform (MIHAI) services 500 according to an implementation as illustrated in FIGS. 1, 2, 3, and 4A-4D. In some implementations, the distributed services may be cloud services with some or all components of the service configured and operating within a cloud computing environment. Each of 502a-c represent "local hubs" which are, in essence, local news hubs/operations. These local hubs, operating on the NewsHub/MIHAI software are identifying and scoring events for newsworthiness by monitoring a variety of sources (e.g., 504a-d). While each local hub can monitor news events happening in their own local market, other hubs can also monitor news in other markets. For example, if there's an event of national significance happening in Dallas a NewsHub subscriber in Atlanta can access the same event data. Or a national news operation can closely monitor events in local markets and filter only for events they reach a newsworthiness threshold for national news. 502a-c indicates three of five illustrated NewsHub/MIHAI local hubs in a distributed news service 506. In some implementations, each of 502a-c, for example, could each be represented wholly or partially by the components illustrated in FIG. 1.

As illustrated, each local hub interfaces with one or more other local hubs and/or the news service 506. In some implementations, the news service 506 aggregates and analyzes data received from local hubs. In some implementations, the news service 506 may instruct processing associated with one or more particular local hubs, manage data streams in and out of one or more local hubs, determine user access criteria for the news service 506 and or one or more local hubs, load balance operations of one or more local hubs, and any other suitable network operation/service related to management of the local hubs and receiving/sending data from/to one or more local hubs.

In some implementations, the news service 506 can contain analytics and/or other suitable services apart from services present on the one or more local hubs. For example, news service 506 is illustrated as offering NARRATIVE SCIENCE analytics 508.

In some implementations, each local hub and the news service 506 may perform some or all of the same operations in a manner coordinated by the news service 506 and/or one or more local hubs. In some implementations, the local hubs and/or the news service 506 cooperatively manage various functions of the distributed intelligent news managed platform and/or newsroom social media platform services. In some implementations, the operations/functions performed by each of the local hubs and/or news service 506 can vary dynamically based upon various criteria including network traffic, news locations, weather, geopolitical events, bandwidth costs, and/or other suitable criteria.

Each local hub may receive data from various data sources. For example, blogs 504a, news staff 504b, citizen application input 504c, power grid messages 504d, and any other suitable data source consistent with this disclosure, whether illustrated or not.

Although FIG. 5 illustrates particular implementations of a distributed intelligent news management platform service, those skilled in the art will appreciate that this is one possible implementation of a multitude of possible distributed intelligent news management platform services to accomplish similar desired functionality. This disclose anticipates other possible implementations not inconsistent with this disclosure for usability, efficiency, practicality, cost, maintenance, and/or or other suitable reasons.

Figure 6:
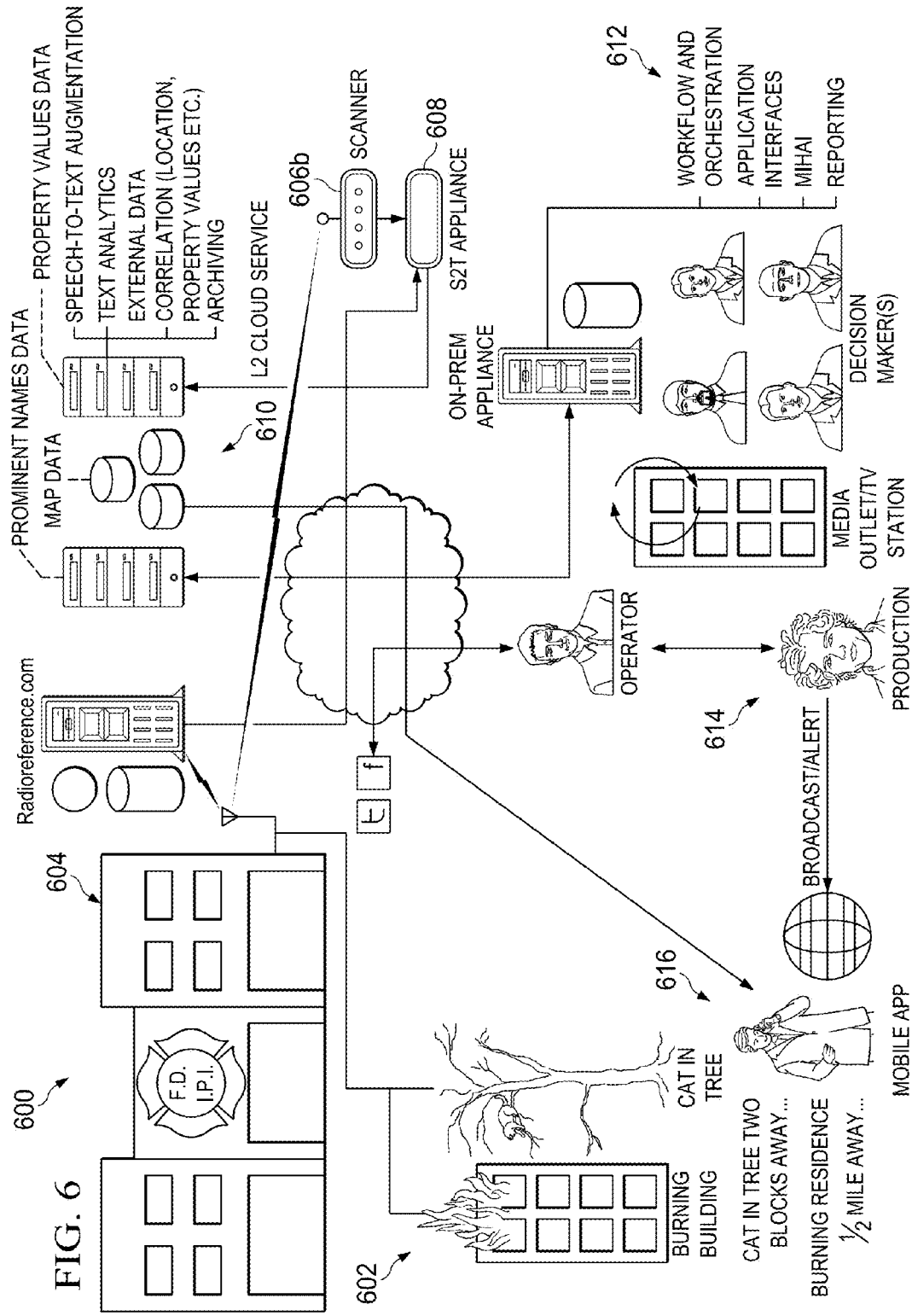
FIG. 6 is a block diagram illustrating an intelligent news management platform and social media platform services concept according to an implementation.

FIG. 6 is a flow diagram illustrating an intelligent news management platform and social media platform services concept 600.

At 602, an event occurs. For example a burning building/cat stuck in tree. From 602, flow 600 proceeds to 604.

At 604, an emergency dispatch occurs. From 604, flow 600 proceeds to 606a.

At 606a scanner sources are monitored for emergency dispatches. For example "radioreference.com" or available scanners. From 606a, flow 600 proceeds to 606b.

At 606b, a scanner receives an emergency dispatch. From 606b, flow 600 proceeds to 608.

At 608, voice-to-text transcription (S2T) occurs. The transcription results in a standardized message format created with tags for fields such as address, alert type, units alerted, and the like. A highly reliable, easily scalable/customizable, fault-tolerant voice-to-text application (V2TA) will handle S2T and can monitor multiple police, EMS, fire and other suitable scanner or other multimedia data feeds in multiple cities to detect and recognize as much speech traffic between dispatchers and responders as possible in real time.

The V2TA will detect/recognize speech received in a data stream from, for example, the Radio Reference website (www.radioreference.com) which captures broadcast scanner traffic and makes it available over the Internet in near real-time in one or more formats, quality levels, etc. Speech data can be source from either quiet (e.g., dispatcher side) or noisy (in the field) type-environments. The V2TA can decipher, filter, etc. both types of data to accurately recognize speech. The V2TA can also monitor and correlate one or multiple speech/data channels to keep communications together in a usable coherent data stream. In some implementations, all speech traffic will be detected, but not necessarily recognized/acted upon (e.g., non-essential words can be dropped—"the," "and," etc.). A small number of keywords will always be recognized and acted upon to detect the type and severity of incidents (e.g., "fire," "burning," "shooting," etc.). The V2TA will, in some implementations, minimize false alarms according to some threshold, for example not more than once per hour.

In some implementations, the V2TA can coordinate with other processes and/or databases to identify names, locations, events, etc. within the context of a geographic area associated with a particular scanner message. For example a fire at MAPSCO coordinate 42-B might result in a lookup of names of residents in that area, local dialects, businesses, schools, etc. Vocabulary associated with that area could be placed on a high priority list for recognition, sensitivity adjusted, etc.

In some implementations, the V2TA can have an extensive library of words enabling detection of keywords, type and severity of incidents, locations such as street names, addresses, names of places, town names, parts of buildings, etc. In some implementations, it is possible to customize place names for each installation of the application, for example at a city or metro area level. Third-party databases can also be leveraged to provide additional data. Data, words, etc. can also be added to, modified, and deleted from the database to improve efficiency.

In some implementations, a speech recognition confidence value for each/groups of word/words can be provided in order to provide a confidence threshold for speech recognition. In addition, beginning and ending timestamps can also be provided as well as the origination feed, location, etc. In some implementations, an entire vocabulary or parts of a vocabulary associated with a particular area can be active.

A keyword vocabulary includes common words and some specialized public safety vocabulary. Names of locations may include numbers, letters and proper names. Some standardization of style and vocabulary will be expected and handled appropriately. Some speakers have training with public safety vocabulary and speak in a standardized way. The V2TA will process dis-fluent speech as efficiently and completely as possible and can operate without speaker training for voice recognition (including male/female, speech disabilities, regional accents, single/multiple speakers (non-overlapping/overlapping), different languages, etc.).

In some implementations, the V2TA can operate on a desktop computer, local server, cloud-based system, mobile device, and the like. In typical implementations, speech will be recognized real-time or substantially real-time (e.g., within one second of speech start or one second after a speech utterance ends). The V2TA can handle multiple simultaneous data streams and provide archiving of received data streams (both raw and processed).

The V2TA can also provide a means for controlling essential functions (configuring audio input parameters/sources, start and cancellation of processing, callbacks for a stream of recognition result events, and error messages). Other suitable functions consistent with this disclosure will be apparent to those skilled in the art. From 608, flow 600 proceeds to 610.

At 610, the message output is sent this to a cloud service for further processing. In some implementations, the message can be processed by the SRT appliance and/or the cloud service/other processing service. In some implementations, the cloud service performs event analytics on text generated by the S2T appliance.

The cloud service can determine "What is this event? How important is the event? How can the event be enriched?" All processed events are typically returned in plain English, identified, ranked and enriched to the On Premise Appliance of 612. In some implementations, the processed events can be returned in any suitable/usable format.

The cloud service is an external and/or automated service that can spot, based on a context, where it received bad/unusable information from S2T Appliance. The cloud service can also provide processed data back to an S2T that can help it learn to be more efficient, sensitive, etc. In most implementations, an S2T cannot learn locally. The data return to an SRT allows a human interaction in the machine learning process as data from the cloud service can be manually updated and modified.

The cloud service can also correct the language text based on context and history, making the text more useable for a cloud analytics engine; correlate events with data in existing databases such as locations, property values and prominent names in the community; and archive raw/analyzed events and facilitate continuous improvement of the entire process. From 610, flow 600 proceeds to 612.

At 612, an on-premises appliance receives the processed data. Rules that control how the processed data is interacted with and shared with various people/interfaces are controlled by the on-premises appliance. The on-premises appliance also handles workflow and orchestration processing tasks. Executed business rules determine who is communicated with, what is needed to go to the next processing step, and the execution of an approval process. The on-premises appliance is associated with application interfaces controlling external communication capabilities, sending event information to apps, interfaces, and a main GUI console; the MIHAI Social Media Platform allowing people in the organization to work together with processed event information; and reporting, including where events are archived so reports can be run efficiently and properly. From 612, flow 600 proceeds to 614 and/or 616.

At 614, event data is prepared and sent to broadcast television, radio, online news, etc. From 614, flow 600 stops.

At 616, event data, location, and context aware information is prepared and sent to mobile devices. Based on event/content ranking, the sent data may be information that is interesting to a wide or narrow audience delivered over a variety of methods (SMS, text, tweets, etc.). From 616, flow 600 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
    collecting auditory detection data with each of a plurality of geographically-distributed, interoperably-connected, local network hubs from available real-time multimedia data streams transmitted by corresponding multimedia data systems, the available real-time multimedia data streams including police scanner, fire scanner, emergency medical services (EMS) scanner, social media data, and web search term data associated with a particular local network hub;
    within each particular local network hub:
        processing the collected auditory detection data using voice recognition analysis to extract subunits of the collected auditory detection data, wherein non-essential words are dropped from the extracted subunits and remaining subunits and data associated with the remaining subunits that is contextually within a geographic area of each available real-time multimedia data stream are recognized and acted upon as event data to detect a type and severity of the event data and to translate and load the event data into searchable data fields;
        cross-checking the processed event data against data retrieved from at least one other available real-time multimedia data stream to confirm the validity of the processed event data;
        prioritizing the processed event data based at least on a source of the event data to created prioritized event data;
        scoring the prioritized event data to create scored event data, wherein the scoring is performed using a multi-level scoring data structure of increasingly specific key word category levels, and wherein the multi-level scoring data structure is used to map the scored event data to one or more of the key word category levels;
        comparing the scored event data value to a newsworthiness threshold; and
        marking the scored event data as actionable when the scored event data is determined to be at least equal to the newsworthiness threshold or re-processing the scored event data using at least the collected auditory detection data when the scored event data is determined to be less than the newsworthiness threshold, wherein reprocessing includes periodically rescoring the prioritized event at a frequency based on the scored event data value, and wherein rescoring is performed by analyzing the auditory detection data for other events that verify or enhance the prioritized event and comparing the prioritized event against static public data; and
    transmitting the scored event data marked as actionable from each particular local network hub to a centralized network hub for analysis and dissemination.

2. The method of claim 1, further comprising identifying additional data related to the scored event data.

3. The method of claim 2, further comprising determining that the additional data related to the scored event data is found.

4. The method of claim 3, further comprising enhancing the prioritized event data to create enhanced event data.

5. The method of claim 4, wherein the enhancement raises the score of the prioritized event data.

6. The method of claim 4, further comprising re-scoring the enhanced event data.

7. A non-transitory, computer-readable medium storing computer instructions executable by a computer to perform operations to:
    collect auditory detection data with each of a plurality of geographically-distributed, interoperably-connected, local network hubs from available real-time multimedia data streams transmitted by corresponding multimedia data systems, the available real-time multimedia data streams including police scanner, fire scanner, emergency medical services (EMS) scanner, social media data, and web search term data associated with a particular local network hub;
    within each particular local network hub:
        process the collected auditory detection data using voice recognition analysis to extract subunits of the collected auditory detection data, wherein non-essential words are dropped from the extracted subunits and remaining subunits and data associated with the remaining subunits that is contextually within a geographic area of each available real-time multimedia data stream are recognized and acted upon as event data to detect a type and severity of the event data and to translate and load the event data into searchable data fields;
        cross-check the processed event data against data retrieved from at least one other available real-time multimedia data stream to confirm the validity of the processed event data;

prioritize the processed event data based at least on a source of the event data to created prioritized event data;

score the prioritized event data to create scored event data, wherein the scoring is performed using a multi-level scoring data structure of increasingly specific key word category levels, and wherein the multi-level scoring data structure is used to map the scored event data to one or more of the key word category levels;

compare the scored event data value to a newsworthiness threshold; and mark the scored event data as actionable when the scored event data is determined to be at least equal to the newsworthiness threshold or re-processing the scored event data using at least the collected auditory detection data when the scored event data is determined to be less than the newsworthiness threshold, wherein reprocessing includes periodically rescoring the prioritized event at a frequency based on the scored event data value, and wherein rescoring is performed by analyzing the auditory detection data for other events that verify or enhance the prioritized event and comparing the prioritized event against static public data; and transmit the scored event data marked as actionable from each particular local network hub to a centralized network hub for analysis and dissemination.

8. The medium of claim 7, further comprising instructions to identify additional data related to the scored event data.

9. The medium of claim 8, further comprising instructions to determine that the additional data related to the scored event data is found.

10. The medium of claim 9, further comprising instructions to enhance the prioritized event data to create enhanced event data.

11. The medium of claim 10, wherein the enhancement raises the score of the prioritized event data.

12. The medium of claim 10, further comprising instructions to re-score the enhanced event data.

13. A system, comprising:

a memory configured to hold at least detection data;

at least one computer interoperably coupled with the memory and configured to:

collect auditory detection data with each of a plurality of geographically-distributed, interoperably-connected, local network hubs from available real-time multimedia data streams transmitted by corresponding multimedia data systems, the available real-time multimedia data streams including police scanner, fire scanner, emergency medical services (EMS) scanner, social media data, and web search term data associated with a particular local network hub;

within each particular local network hub:

process the collected auditory detection data using voice recognition analysis to extract subunits of the collected auditory detection data, wherein non-essential words are dropped from the extracted subunits and remaining subunits and data associated with the remaining subunits that is contextually within a geographic area of each available real-time multimedia data stream are recognized and acted upon as event data to detect a type and severity of the event data and to translate and load the event data into searchable data fields;

cross-check the processed event data against data retrieved from at least one other available real-time multimedia data stream to confirm the validity of the processed event data;

prioritize the processed event data based at least on a source of the event data to created prioritized event data;

score the prioritized event data to create scored event data, wherein the scoring is performed using a multi-level scoring data structure of increasingly specific key word category levels, and wherein the multi-level scoring data structure is used to map the scored event data to one or more of the key word category levels;

compare the scored event data value to a newsworthiness threshold; and mark the scored event data as actionable when the scored event data is determined to be at least equal to the newsworthiness threshold or re-processing the scored event data using at least the collected auditory detection data when the scored event data is determined to be less than the newsworthiness threshold, wherein reprocessing includes periodically rescoring the prioritized event at a frequency based on the scored event data value, and wherein rescoring is performed by analyzing the auditory detection data for other events that verify or enhance the prioritized event and comparing the prioritized event against static public data; and transmit the scored event data marked as actionable from each particular local network hub to a centralized network hub for analysis and dissemination.

14. The system of claim 13, further configured to identify additional data related to the scored event data.

15. The system of claim 14, further configured to determine that the additional data related to the scored event data is found.

16. The system of claim 15, further configured to enhance the prioritized event data to create enhanced event data.

17. The system of claim 16, wherein the enhancement raises the score of the prioritized event data.

18. The system of claim 16, further configured to re-score the enhanced event data.

19. The method of claim 1, wherein the marked scored event data is used as part of a graphical virtual story room for dissemination to one or more external data outlets.

20. The method of claim 1, wherein the actionable-marked scored event data is sorted using a custom filter.

* * * * *